Dec. 29, 1925.　　　　　　　　　　　　　　1,567,472
B. E. SKILES
SOLID TIRE FACER AND GROOVER
Filed Dec. 13, 1923　　　2 Sheets-Sheet 1
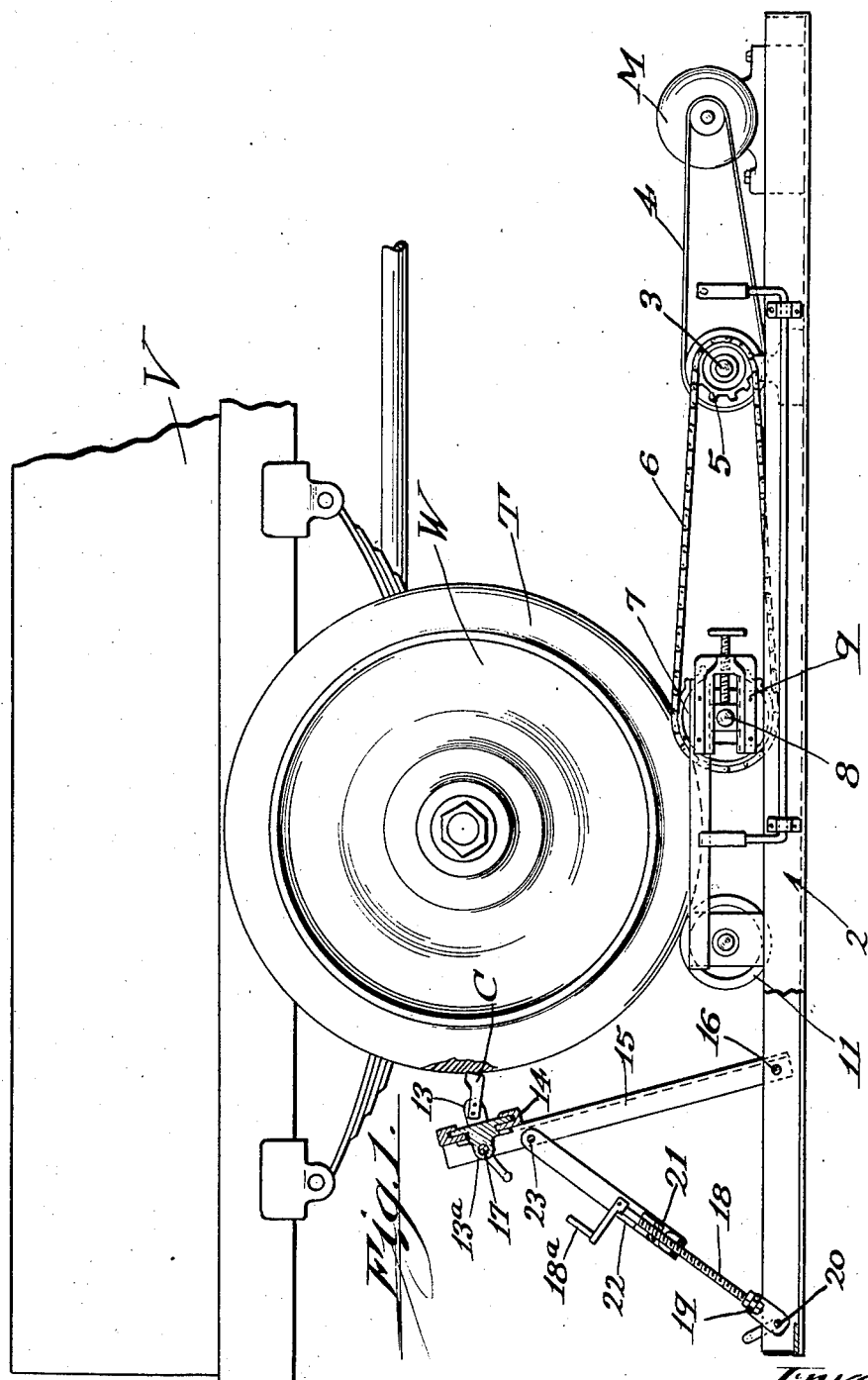

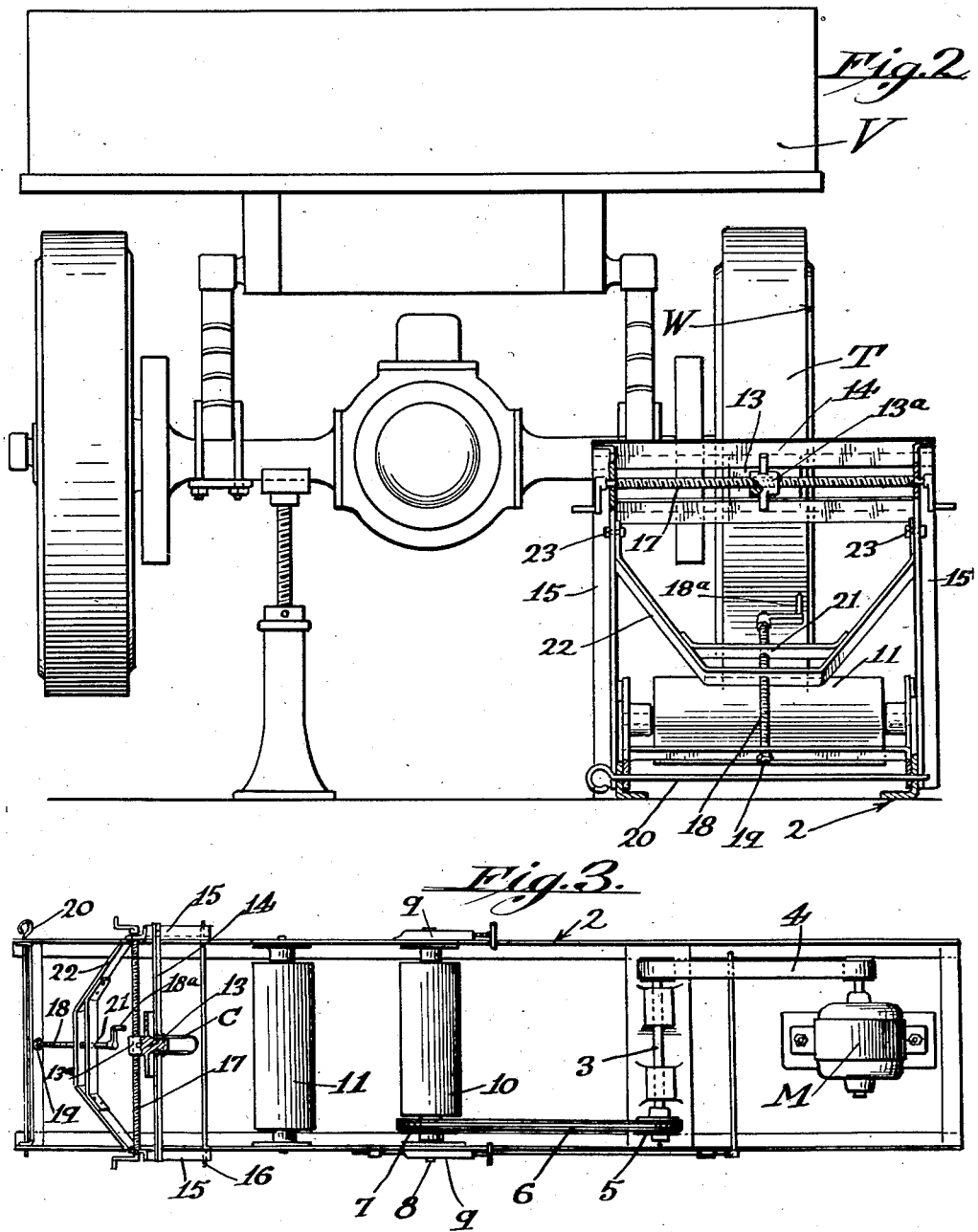

Patented Dec. 29, 1925.

1,567,472

UNITED STATES PATENT OFFICE.

BRUCE E. SKILES, OF SANTA ANA, CALIFORNIA.

SOLID-TIRE FACER AND GROOVER.

Application filed December 13, 1923. Serial No. 680,457.

*To all whom it may concern:*

Be it known that I, BRUCE E. SKILES, a citizen of the United States, residing at Santa Ana, in the county of Orange and State of California, have invented new and useful Improvements in Solid-Tire Facers and Groovers, of which the following is a specification.

The invention relates to a device for dressing or facing solid rubber tires of vehicles.

It is an object of the present invention to provide a means of practicable and substantial form, and by which a tire while in place on a wheel can be faced or dressed or grooved.

Another object is to provide a tire facing or grooving device whereby an elevated wheel of a vehicle carrying a solid tire can be quickly and uniformly faced or smoothed or grooved.

Another object is to provide a facing device including a tool engageable with the tire to be faced, and to provide for the ready adjustment of the tool to tires of different diameters.

Other objects and advantages will be made manifest in the following specification of an embodiment of the invention illustrated in the accompanying drawings, wherein Fig. 1 is a side elevation of the apparatus as in use.

Fig. 2 is an end view with parts in section.

Fig. 3 is a plan.

The present instrument includes a suitable and substantial bed frame or platform 2, at one end of which is provided a suitable motor M, by which is driven a cross shaft 3, as for instance by a pulley and belt 4.

The cross shaft 3 is provided with a sprocket wheel 5 engaged by sprocket chain 6 extending to sprocket wheel 7 secured on and driving a countershaft 8, which is preferably mounted in adjustable boxes 9.

On the countershaft 8 is a cylindrical roller 10 which is parallel to another cylindrical roller 11 journaled on the frame 2 and running free.

The spaced rollers 10 and 11 are provided to receive and rotatably support the tire T which is to be faced or grooved and which may be operated while in place on the wheel W of a vehicle V. When the motor is operating, power is transmitted to the roller 10 and this is driven and thereby the wheel W is rotated at a suitable rate of speed readily determined by a proper ratio of transmitting means connecting the roller 10 and the motor. Cutting means includes any suitable style and shape of cutter C which is detachably connected to a slide 13 slidably mounted in a guide 14 extending transversely of the frame 2 and mounted on the upper ends of a pair of swinging arms 15, the lower ends of which are pivotally connected at 16 to the frame 2.

The slide 13 has a threaded part 13ª engaged by a feed screw 17 journaled in the upper ends of the arms 15 of the slide frame so that by turning the said screw the cutter C may be advanced gradually transversely across the face of the tire T.

Means are provided for advancing the cutter toward or retracting it from the tire and such means is shown as including a jack screw 18, the lower end of which is mounted in a stirrup 19, the ends of which are pivotally connected at 20 to the frame 2 so that the stirrup can terminate in a vertical plane. The open end of the jack screw engages a threaded part 21 of a frame 22, having divergent side arms which are pivotally connected at 23 to the upper portions of the slide frame arms 15. It will be seen that by turning the jack screw 18 by its handle 18ª, the frame 22 may be forced upwardly or retracted with a corresponding movement of the slide frame 15 so as to bring the cutter C into an engagement with or away from the tire T. The jack screw 18 and its frame 22 provide not only a means for advancing or retracting the cutter, but furthermore provide a substantial support for the frame.

From the above it will be seen that I have provided a simple, practicable, and effective and substantial means for quickly facing or grooving a tire while the same is in place upon a wheel or vehicle.

Further embodiments, modifications and variations may be resorted to within the principle of the invention.

What is claimed is:

1. A solid tire facer and groover comprising a bed frame, a motor mounted on one end of the bed frame, a cross shaft mounted on the bed frame substantially half way between the motor and the center of the frame, means for connecting the motor to the cross shaft, a counter-shaft mounted on the bed frame near its center, means for connecting the cross shaft to the counter-shaft, a roller on the counter-shaft, a second roller parallel with the first roller and spaced therefrom and mounted on the bed frame, said rollers being adapted to receive and rotatably support a tire to be operated upon, a pair of arms pivotally connected to the bed frame and extending upwardly, a slide mounted upon the upper ends of the arm and adapted to move transversely, a screw for operating the slide, a cutter carried by the slide and adapted to engage the rotating tire, and a jack screw connected to the bed frame and to the upper parts of the arms for swinging the arms to move the cutter to or from the tire.

In testimony whereof I have signed my name to this specification.

BRUCE E. SKILES.